Figures 1, 2, 3, 4, 5, 6:
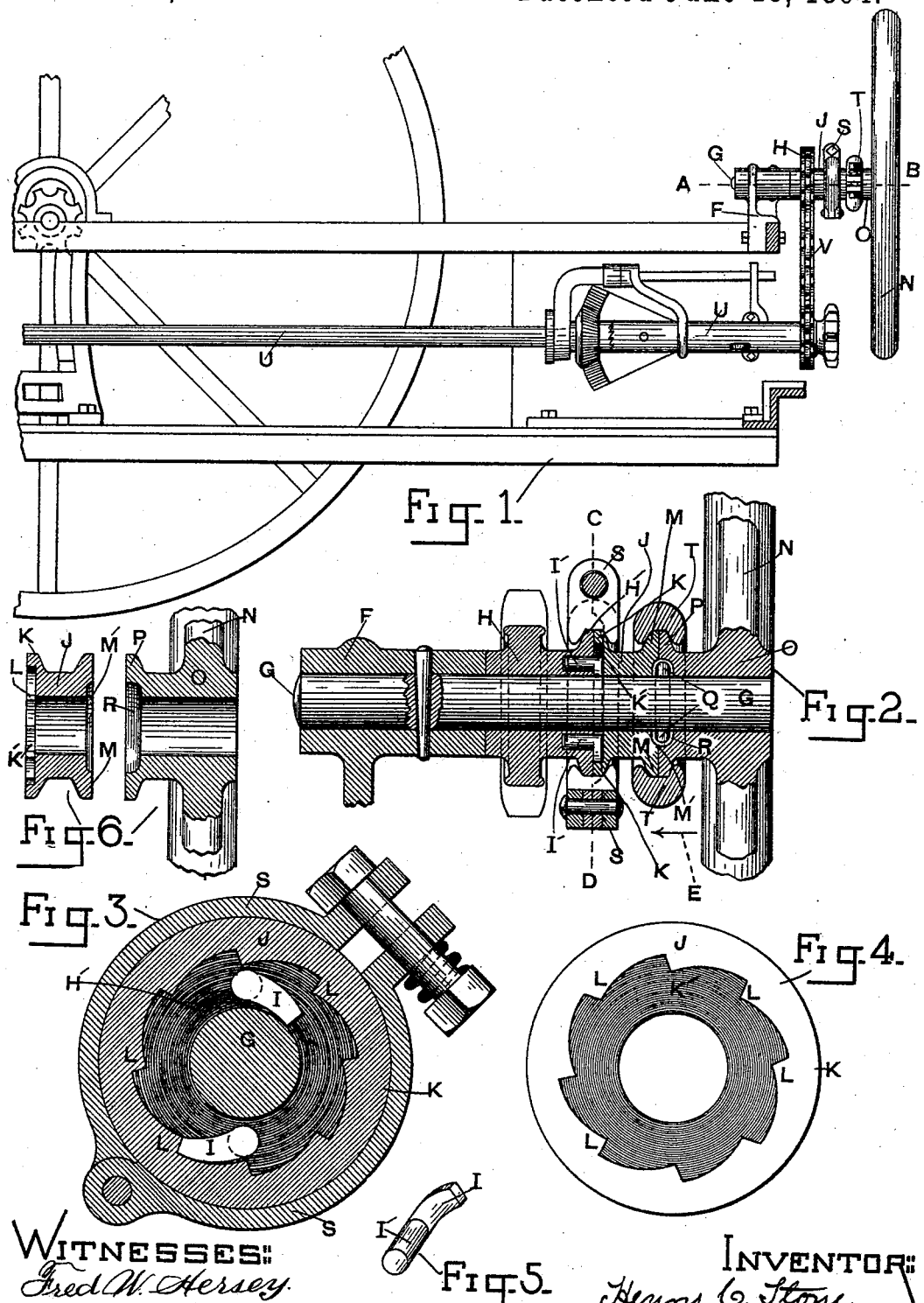

(No Model.)

H. C. STONE.
FRICTIONAL CLUTCH FOR HARVESTERS.

No. 521,485. Patented June 19, 1894.

WITNESSES:
Fred W. Hersey.
Frank H. Smith.

INVENTOR:
Henry C. Stone.
By his attorney Oscar Snell.

UNITED STATES PATENT OFFICE.

HENRY C. STONE, OF SOUTH EVANSTON, ILLINOIS, ASSIGNOR TO OLIVE A. STONE, OF SAME PLACE.

FRICTIONAL CLUTCH FOR HARVESTERS.

SPECIFICATION forming part of Letters Patent No. 521,485, dated June 19, 1894.

Application filed December 27, 1892. Renewed November 27, 1893. Serial No. 492,152. (No model.)

*To all whom it may concern:*

Be it known that I, HENRY C. STONE, a citizen of the United States, residing at South Evanston, in the county of Cook and State of Illinois, have invented a new and useful Frictional Clutch for Harvesters, of which the following is a specification.

My invention relates particularly to an improvement in a frictional clutch for harvesters which was patented by me in the United States of America November 24, 1891, and numbered 463,752, which is adapted to harvesting machines of all kinds, but more particularly to automatic binding harvesters, whose duty is irregular, the mechanism requiring much more power to drive it at one time than at another, in the operation of binding grain.

The objects attained in the present invention, hereinafter described, are to mount the entire mechanism upon a stud pin and transmit the force of the fly wheel to the mechanism of the harvester, or the force from the mechanism of the harvester to the fly wheel directly through the several parts comprising the sprocket wheel clutches and fly wheel, as will be hereinafter more fully described.

Another object in my new construction is to thus avoid communicating force either to or from the fly wheel through a special fly wheel shaft, thus better adapting the device to all forms of harvesters, and making it possible to connect the back chain of many kinds of harvesters directly with the mechanism comprising my device.

Other objects are attained by mounting my entire mechanism upon a stud pin, among which may be mentioned that it can be produced at a greatly reduced cost in comparison to the mechanism for the purpose shown in the patent hereinbefore referred to, and then, by means of a simple pin passing through the stud pin several of the parts are movably held on the stud pin, permitting the fly wheel to be removed without the removal of the other parts, thus effectually avoiding the loss of the smaller parts which can always remain in proper position, as will be hereinafter described, and which are illustrated in the accompanying drawings, in which—

Figure 1 is a detail elevation of a portion of a harvester upon a part of which is mounted my new frictional clutch, and fly wheel attached thereto. Fig. 2 is a detail section taken on line A—B Fig. 1. Fig. 3 is a cross section taken on line C.—D., Fig. 2, looking in direction of arrow E. Fig. 4 is an end elevation of the face of the ratchet friction sleeve connection. Fig. 5 is a perspective view of one of the pawls and the pivotal journal thereof. Fig. 6 shows, respectively, a section of the ratchet sleeve connection, and of the hub portion of the fly wheel, as they would appear when removed from Fig. 2.

Similar letters indicate like parts throughout the several views.

F is a bracket which is firmly attached to the frame of the harvester, and there is securely attached to this bracket a round stud pin G upon which pin is loosely mounted to revolve the several parts of my friction clutch, and also a fly wheel making a part of the same. Next to bracket F is loosely mounted the sprocket wheel H, and one end of this wheel has a flange H' which extends outward radially, and into the face thereof are holes in which are mounted the pivotal shanks I' of pawls I, as shown in Figs. 2 and 3. The pawls I rest against the face of flange H'. Next to the sprocket wheel H is mounted the ratchet friction sleeve connection J, which has a flange K at the end adjacent to and in contact near the peripheral margin with flange H', but the face of flange K is recessed at K' in a circular form to receive the projecting pawls I from the face of flange H', as is shown in Fig. 2, and around the periphery of circular recess K' are inwardly projecting teeth L, which are adapted to engage pawls I in one direction of revolution of either sprocket wheel H or connection J. At the opposite end from the pawls described, ratchet friction sleeve connection J has another radially projecting flange shown by M, and at M' the face of the flange has a shallow circular recess. Next to connection J is mounted the fly wheel N, whose hub O is provided with a flange P similar to the flange M of connection J, the two flanges when in operative position being in contact near the periphery, as shown in Fig. 2. There is a circular recess R in the face of flange P, which recess is deeper but of the same diameter as the recess M' in the face of the flange of connection J.

At Q are the ends of a pin which is driven through stud pin G, the ends projecting radially at opposite sides of the stud pin, the ends Q of the pin having a position between flange M of connection J, and flange P of hub O, within the recesses in the faces of the two flanges, as shown in Fig. 2, and serving as retaining lugs to prevent the removal of the sprocket wheel H and the sleeve J with their accompanying parts when the fly wheel is removed.

Fig. 2 shows friction band S applied to the contacting flanges K and H', and friction band T applied to contacting flanges M and P, so that the fly wheel is connected to sprocket wheel H by a double clutch, or by two different friction clutches, and sprocket wheel H is connected to the harvester crank shaft U by means of a chain belt V, similar to what is shown in the patent granted to me, and hereinbefore referred to, it being understood, however, that the clutches must be adjustable to any desired degree of tension, and that the particular construction of these clutches may vary to suit the circumstances incident to use.

I claim as my invention—

1. In a harvester, the combination, with a stud pin adapted to be rigidly secured at one end to the frame of the machine, a sprocket wheel loosely mounted thereon and adapted to be connected with the operating parts of the machine, a fly wheel loosely mounted upon said pin, a sleeve loosely mounted upon the pin between the sprocket wheel and the fly wheel, a friction clutch connecting one end of said sleeve with the fly wheel, another clutch connecting the other end of the sleeve with the sprocket wheel, and both of said clutches being adjustable to any desired tension, and means for preventing the longitudinal movement of the wheels and sleeve upon the pin, substantially as set forth.

2. In a harvester, the combination, with a rigid pin, of a sprocket wheel mounted loosely thereon, a sleeve adjacent the sprocket wheel, a fly wheel adjacent the sleeve, a pin through the rigid pin at the adjacent ends of the sleeve and the hub of the fly wheel, the ends of which pin engage with the outer end of the sleeve and prevent its longitudinal movement upon the rigid pin, substantially as set forth.

3. In a harvester, the combination, with a rigid pin, of a sleeve loosely mounted thereon, a fly wheel loosely mounted upon the pin and secured to the sleeve, and means intermediate the wheel and the sleeve for preventing the longitudinal movement of the sleeve upon the pin, substantially as set forth.

4. In a harvester, the combination, with a rigid pin, of a sprocket wheel loosely mounted thereon, one end of which is provided with gravity pawls, a sleeve upon the pin, one end of which is provided with ratchet teeth to be engaged by the pawls, a fly wheel upon the outer end of the pin, the inner end of which is recessed, a pin through the rigid pin, the ends of which project into the recess of the fly wheel, and a frictional clutch connecting the fly wheel and the sleeve for holding them together in frictional contact, substantially as set forth.

In testimony that I claim the foregoing I have hereunto set my hand this 22d day of December, 1892, in the presence of witnesses.

HENRY C. STONE.

Witnesses:
OSCAR SNELL,
J. B. BARTLETT.